UNITED STATES PATENT OFFICE.

JAMES G. TARR AND AUGUSTUS H. WONSON, OF GLOUCESTER, MASS.

IMPROVEMENT IN PAINTS FOR SHIPS' BOTTOMS.

Specification forming part of Letters Patent No. 40,515, dated November 3, 1863; reissue No. 2,722, dated August 6, 1867; reissue No. 4,598, dated October 17, 1871.

DIVISION A.

*To all whom it may concern:*

Be it known that we, JAMES G. TARR and AUGUSTUS H. WONSON, of Gloucester, in the county of Essex and State of Massachusetts, have invented an Improved Paint for Ships' Bottoms; and we do hereby declare that the following is a full and exact description thereof and of the mode of making the same.

The object of our invention is to prevent the fouling of the bottoms of ships by the adhesion of barnacles, sea-weeds, and other substances; and this we effect by means of our improved paint or composition, which is applied to the hull of the vessel with a brush in the ordinary manner.

When one hundred gallons of paint are to be made we proceed as follows: Into a vat or tank of suitable size we pour forty gallons of Stockholm tar, and mix with this thirty gallons of benzine or naphtha, which must be added gradually a few gallons at a time, and rapidly stirred. When the benzine or naphtha is all put in, the mixture should be stirred for about half an hour, or until the ingredients are well incorporated. The vat must then be closed with a tight-fitting cover and allowed to stand for about twenty-four hours. During this time a deposit takes place, the residuum consisting principally of heavy matters that are not soluble in the benzine or naphtha, the quantity thus deposited being usually about one gallon to each ten gallons of the mixture. The part remaining liquid is now drawn into another vat, and thirty gallons of dry oxide of copper, finely pulverized, are added to it, and, after being well stirred, the paint is ready for use. About seven gallons of paint, prepared as above described, are required for one coat on a vessel of one hundred tons.

We prefer to employ the oxide of copper made from the pyritous friable ores, because, besides being easily reduced to fine powder, these contain mineral and earthy substances, such as various other metallic oxides, sulphur, &c., which serve to divide the particles of oxide of copper, interspersing between them substances which dissolve more slowly than they do, or which do not dissolve at all, it being desirable, for the sake of economy, that the solution should be less rapid than would take place with a pure oxide of copper, and yet sufficient to give the necessary protection to the bottom. When mineral and earthy matters are so mixed with the oxide of copper, the proportion in which they are mixed will, of course, vary greatly with the quality of the ore used, if an ore is employed; and it may be found desirable in mixing any mineral or earthy matters with the oxide of copper for the above-described purpose, that their proportion should so vary with reference to varying lengths of voyages which are to be made, and the nature of the waters in which they are to be made. All that is desired is, that there should be a proper base, such as these earthy or mineral matters furnish, to retard the solution of the oxide of copper, and give durability to the paint. Such a base, however, although desirable in our judgment, and as such claimed as an element in the composition of paint which we have patented in another reissue taken at the same time with this one, is not indispensible; and, therefore, in this present specification we do not intend to limit ourselves to its use, for a good paint may be made by the use of oxide of copper alone with the vehicle herein described; the oxide of copper, which yields a poisonous solution in water, furnishing the necessary protection against animal and vegetable growth. The oxide of copper which we prefer to use is that known in commerce as "copper scale."

The proportion above named of thirty gallons of dry oxide of copper for a hundred gallons of paint may be varied according to the purity of the oxide of copper employed. If it is entirely or nearly pure, the proportion above named may be considerably diminished so long as enough is used to make the paint of proper consistency, and to enable it to have the required preservative action.

We are aware that salts of copper, such as verdigris, mixed with linseed oil have been long used for protecting ships, and that a patent has been granted to Charles Wettersted for the use of pure metallic alloys of copper and other metals in the form of powder mixed with vegetable-tar and linseed-oil, boiled with litharge or with naphtha for such purpose. In section eight of his specification he refers to the protection of iron by the use of a mixed paint composed of metallic alloys and pure oxide of copper, prepared in a particular manner, as an outer coating or glazing paint to be applied upon his paint before mentioned. Reference is also made to the galvanic protection his metallic alloys afford, and a ships' paint which may be made of pulverized antimony and pure oxide of copper, which, however, by reason of the ready solubility of the antimony in water, could not make a practicable ships' paint. We disclaim all such mixtures as are here referred to.

The proportions of tar and benzine above described are specified simply as in our judgment the most suitable; and they may be greatly varied according to the kind and quality of the tar employed, as they are designed merely for a vehicle or medium. In place of the naphtha or benzine any known diluent may be employed. The result of mixing should be the production of a vehicle of about the consistency of linseed-oil.

What we claim is—

A paint, consisting of oxide of copper with a suitable vehicle or medium, substantially as described.

JAMES G. TARR.

Witnesses: AUGUSTUS H. WONSON.
N. AUSTIN PARKS,
J. HENRY TAYLOR. (107)